Nov. 26, 1935.  H. D. CHURCH  2,022,618
TRANSMISSION
Filed Nov. 26, 1929  3 Sheets-Sheet 1
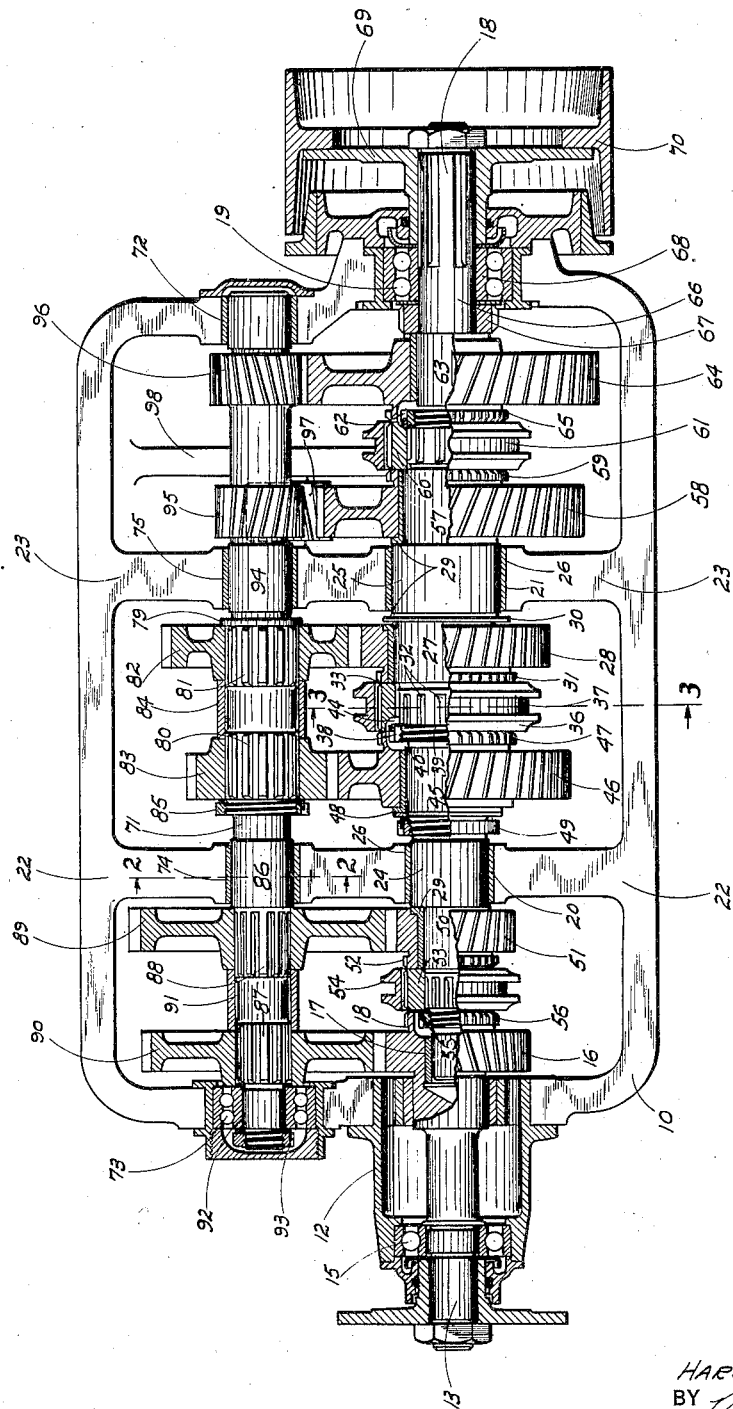
INVENTOR
HAROLD D. CHURCH.
BY
ATTORNEY Nov. 26, 1935.  H. D. CHURCH  2,022,618
TRANSMISSION
Filed Nov. 26, 1929    3 Sheets-Sheet 2
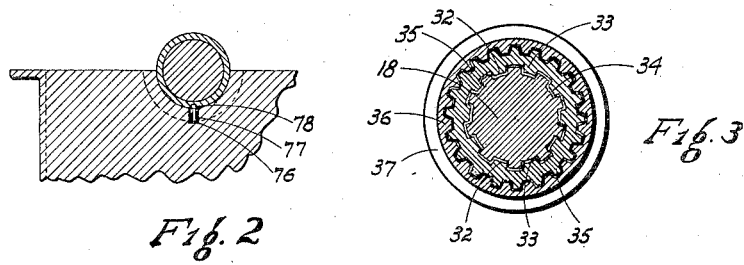
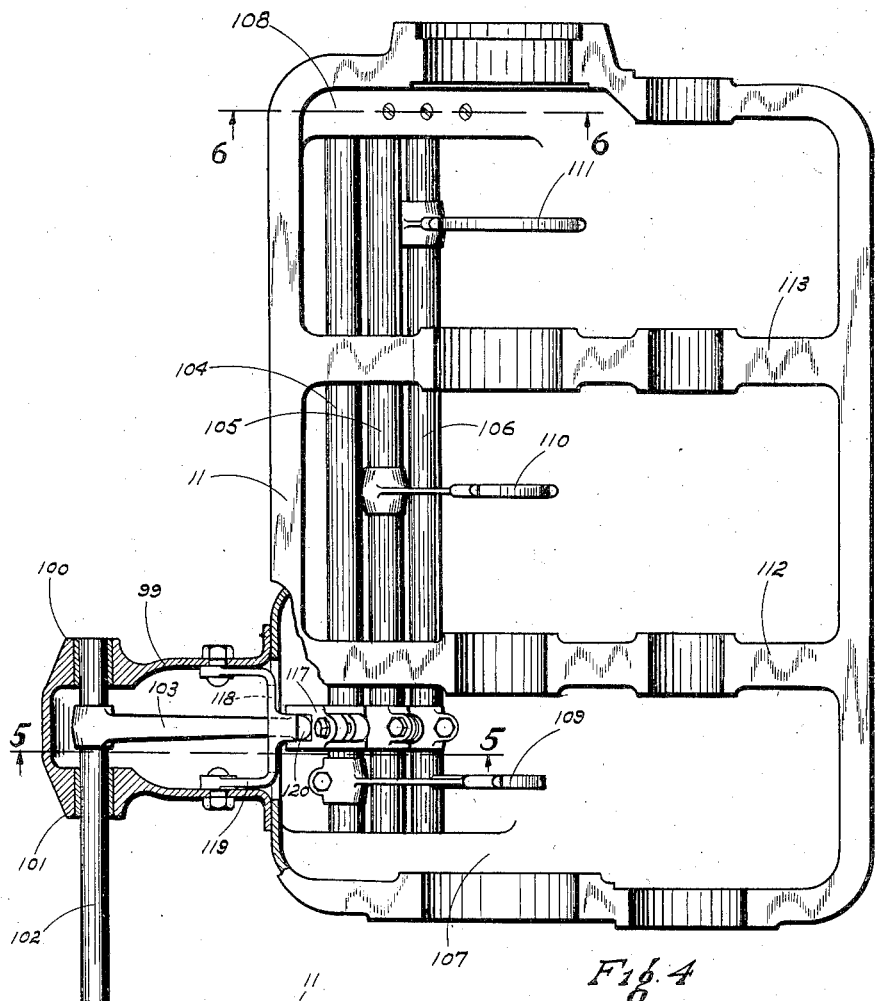
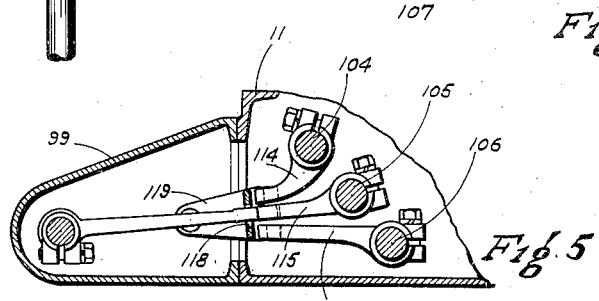
INVENTOR
HAROLD D. CHURCH.
BY
ATTORNEY Nov. 26, 1935.                    H. D. CHURCH                    2,022,618
                                  TRANSMISSION
                              Filed Nov. 26, 1929            3 Sheets-Sheet 3
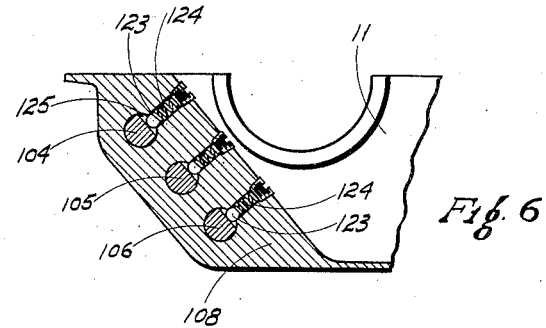
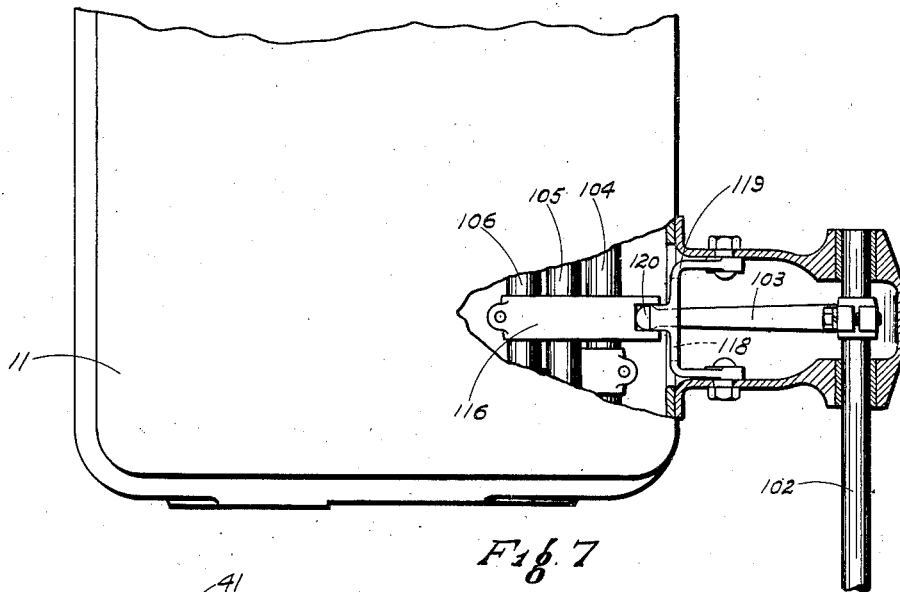
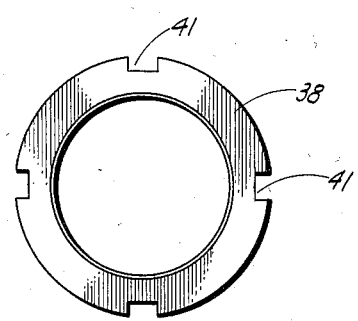
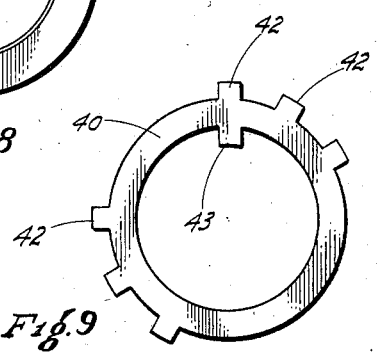
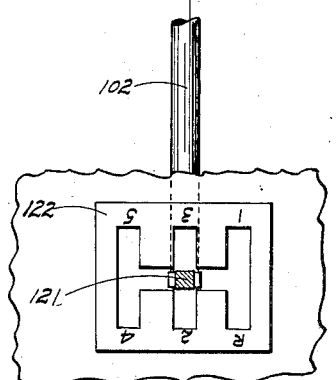
INVENTOR
HAROLD D. CHURCH.
BY *Richey & Watts*
ATTORNEY Patented Nov. 26, 1935

2,022,618

UNITED STATES PATENT OFFICE 2,022,618

TRANSMISSION

Harold D. Church, Cleveland, Ohio, assignor to The White Motor Company, Cleveland, Ohio, a corporation of Ohio Application November 26, 1929, Serial No. 409,839

7 Claims. (Cl. 74—375)

This invention relates to automotive vehicle transmissions, and more particularly to transmissions for heavy duty trucks and busses.

One object of this invention is to provide an improved transmission in which cooperating gears are in constant mesh and shifting is effected by clutching a selected gear to its shaft.

Another object is to provide an improved shifting mechanism for remote control of a transmission.

A further object is to arrange the transmission and the shifting mechanism in such a manner as to secure standard control lever positions with a five speed and reverse transmission.

Other objects are to provide an improved five speed and reverse transmission, and to arrange the elements thereof in such a manner as to facilitate assembly and servicing.

Other objects relating to details of construction and economies of manufacture will appear from a more complete examination of this specification.

In the accompanying drawings, which illustrate one embodiment of this invention:

Fig. 1 is a top plan view of the lower half of a transmission casing with the gears and shafts assembled therein, parts being broken away to more clearly show the construction;

Fig. 2 is a section taken on the line 2—2 of Fig. 1;

Fig. 3 is a section taken on the line 3—3 of Fig. 1;

Fig. 4 is a bottom plan view of the upper half of the transmission casing with the shifting forks assembled therein, a portion of the casing being broken away to show the operating shaft;

Fig. 5 is a section taken on the line 5—5 of Fig. 4;

Fig. 6 is a section taken on the line 6—6 of Fig. 4;

Fig. 7 is a top plan view of the upper half of the casing showing the operating shaft and lever assembled therewith;

Fig. 8 is a plan view of a nut used to lock certain parts on a shaft;

Fig. 9 is a plan view of a lock washer associated with the nut shown in Fig. 8.

Referring to the drawings, the transmission shown herein is assembled in a casing consisting of a lower half 10 and an upper half 11. The front wall of the lower half of the casing is provided with a housing 12 secured thereto in any suitable manner. A driving shaft 13 is journalled in the housing at 14, and is additionally supported therefrom by combined radial and thrust bearings 15. This shaft is arranged to be actuated by the engine of the vehicle through a clutch in the conventional manner. At its inner end the shaft 13 is provided with an integral spiral gear 16 which is axially bored at 17 to provide a bearing for the front end of the driven shaft 18. The gear 16 is of such a diameter that the housing 12 and driving shaft 13 can be assembled as a unit and subsequently secured to the casing.

The driven shaft 18 is supported from the rear wall of the casing by combined radial and thrust bearings 19, and is further supported in journals 20 and 21 which are formed respectively in webs 22 and 23 integral with the casing 10. Bearings 24 and 25 on the shaft 18, carry bushings 26 and bear in the journals 20 and 21, respectively. The bearing 25 constitutes the largest portion of the shaft 18 in order to permit the assembly of the parts on the shaft by threading such parts thereon in the sequence in which they will be described.

Immediately adjacent the bearing 25 toward the front end of the shaft is a slightly smaller bearing 27 which receives the gear 28 and flanged bushing 29. A thrust washer 30 is interposed between the end of the bearing 25 and the flange of the bushing 29. The gear 28 is formed with an integral extension having external clutch teeth 31.

Adjacent the bearing 27, a further reduced portion of the shaft 18 is formed with forwardly opening keyways 32 and receives a sleeve 33 having internal keys 34. (See Fig. 3.) The sleeve 33 is provided externally with splines 35 having an arrangement and size corresponding to the arrangement and size of the clutch teeth 31. An internally splined clutch 36 provided with an external groove 37 for cooperation with a shifting fork is slidably mounted on the spline 35 and is adapted to be slid into engagement with the clutch teeth 31.

The sleeve 33 abuts against bearing 27 and serves as a thrust member to retain the gear 28 and bushing 29 on the bearing. The sleeve is held against the bearing by means of a nut 38 which is screwed upon a threaded portion 39 of the shaft and is locked against turning by a lock washer 40. (See Figs. 8 and 9.) The nut is provided with a plurality of recesses 41 adapted to receive any one of a plurality of unevenly spaced bendable lugs 42 on the washer. The washer is held against turning on the shaft by means of an internal lug 43 which projects into a slot in the shaft. The sleeve is formed with an annular recess 44 into which the nut fits so that the clutch member is slidable over the nut.

Adjacent the threaded portion 39 the shaft 18 is formed with a bearing 45 which is reduced in diameter sufficiently to permit the sleeve and nut to pass thereover. A gear 46 and flanged bushing 29 are mounted upon this bearing, the gear 46 having an annular flange which extends over the nut 38 and bears against the sleeve 33, and which is provided externally with clutch teeth 47 for cooperation with the sliding clutch member 36.

The gear 46 is retained in position by a thrust washer 48 against which bears a nut 49 locked in position by a lock washer 40, the nut 49 being similar to, but smaller than, the nut 38.

The bearing 24 is adjacent the threaded portion of the shaft which receives the nut 49, and is small enough to permit all the elements heretofore described to be passed thereover.

Adjacent the bearing 24, the shaft is further reduced in diameter to form the bearing 50 upon which is mounted the gear 51 and a flanged bushing 29. The gear 51 is formed with an extension provided with external clutch teeth 52, similar to the clutch teeth 31 formed on the gear 28.

Adjacent the bearing 50 and abutting thereagainst is a sleeve 53 carrying a sliding clutch member 54 and retained in position by a nut 55, similar in every respect except as to size to the sleeve 33, clutch 36, and nut 38. The extreme forward end of the shaft 18 is small enough to permit all the elements heretofore described to be passed thereover, and bears in the axial bore 17 formed in the driving shaft gear 16. The latter gear is provided with a flange projecting over the nut 55 spaced from the sleeve 53, and formed with clutch teeth 56 for cooperation with the sliding clutch member 54.

Toward the rear end of the shaft 18, a bearing 57 is formed adjacent the bearing 25 and carries the gear 58 and a flanged bushing 29. The gear 58 is formed with an integral extension which is provided with clutch teeth 59 similar to the clutch teeth 31 on the gear 28. Abutting the bearing 57 is a sleeve 60 carrying a sliding clutch member 61 and held in place by a nut 62, similar to the sleeve 33, clutch 36, and nut 38, except that the keyways in the shaft on which the sleeve is mounted open rearwardly so that these members may be threaded on the shaft from the rear end.

Adjacent the threaded portion of the shaft on which the nut 62 is screwed is a bearing 63 carrying the gear 64 and a flanged bushing 29, the gear 64 having a flange which extends over the nut 62 and bears against the sleeve 60 and which is provided with clutch teeth 65 for cooperation with the clutch 61.

A further reduced portion 66 of the shaft 18 carries a speedometer gear 67 and a bearing race 68 and terminates in a splined portion to which is secured the flanged element 69 which cooperates in any conventional manner with a propeller shaft. A brake drum 70 may also be carried by the member 69 if desired. The race 68 cooperates with the anti-friction bearings 19 in the usual manner to resist radial loads and end thrust.

It will be evident from the foregoing description that the driven shaft is rigidly supported in four main bearings and carries five gears which are rotatable on the shaft but which are effectively fixed against displacement along the shaft. It will also be evident that the shaft may be readily assembled as a unit by threading the various elements thereon consecutively from the opposite ends, and that the entire structure can be easily disassembled for servicing. The three sliding clutch members are fixed against rotation with respect to the shaft by the splined engagement with their respective sleeves, which are in turn splined to the shaft.

A countershaft 71 has one end journalled at 72 in the rear wall of the casing section 10, and has its opposite end supported from the front wall of the casing by the combined radial and thrust bearing 73. At intermediate points the countershaft is supported in journals 74 and 75 formed in the webs 22 and 23, respectively. In each of the journals 72, 74 and 75 is a bushing 26 similar to the bushings 26 in the journals 20 and 21 which support the driven shaft 18. Each of these bushings 26 is secured in its respective journal against rotation or longitudinal displacement by dowel pins 76, as shown in Fig. 2. These pins are placed in drilled holes 77 in the journals and protrude beyond the inner surfaces thereof for engagement in recesses 78 in the bushings.

The countershaft is formed with portions of different diameters so that it may be assembled as a unit in the same manner as the driven shaft 18. An integral collar 79 constitutes the largest portion of the countershaft 71. Toward the forward end of the shaft from this collar are formed splined portions 80 and 81 of the same diameter. A gear 82 fits upon the splines 81 and abuts against the collar 79, this gear being arranged to mesh with the gear 28 on the driven shaft. A gear 83, meshing with the gear 46, fits upon the splines 80 and is held spaced from the gear 82 by means of a spacing sleeve 84. A nut 85 is screwed upon the shaft to securely position the gears 82 and 83 upon their respective splines.

Beyond the threaded portion of the shaft which receives the nut 85 is formed a bearing 86 which bears in the journal 74. Splined portions 87 and 88 having substantially the same diameter but being smaller than the bearing 86 are formed near the front end of the countershaft. A gear 89 fits on the splines 88 and abuts the bearing 86, this gear being arranged to mesh with the gear 51. A gear 90, meshing with the gear 16, is mounted on the splines 87 and is positioned by means of a spacing sleeve 91.

A bearing race 92 fits on the countershaft and abuts the gear 90, holding both the gears 89 and 90 in their proper positions. A nut 93 screwed on the extreme end of the shaft retains the bearing race 92.

Toward the rear end from the collar 79 the countershaft is formed with a bearing 94 which cooperates with the journal 75. A pair of small gears 95 and 96, which are not substantially larger than the countershaft, are preferably formed integral therewith. The gear 96 meshes with the gear 64, and the gear 95 meshes with a small gear 97 supported from the web 98. The gear 97 also meshes with the gear 58 to provide a reverse gearing train.

It will be seen that the countershaft is constantly driven by the driving shaft through the gears 16 and 90. Rotation of the countershaft causes rotation of all the gears on the driven shaft, since the latter are in constant mesh with their corresponding countershaft gears. Engagement of any one of the clutch members with the clutch teeth on a driven shaft gear causes rotation of the driven shaft with such gear.

The various pairs of gears are constructed with such dimensions that low, or first speed, is obtained through gears 64 and 96 when the clutch 61 is engaged with the clutch teeth 65. Reverse is obtained by moving the clutch 61 forwardly until it engages the teeth 59, causing rotation of the driven shaft through gears 58, 97 and 95.

Second speed is obtained through gears 46 and 83 by moving the clutch 36 forwardly into engagement with the teeth 47. Shifting the clutch 36 to its rearward position in engagement with the teeth 31 effects rotation of the driven shaft through gears 28 and 82, giving the next higher, or third speed.

Fourth speed is obtained by moving the clutch 54 forwardly into engagement with the teeth 56 to directly couple the driving and driven shafts. Shifting the clutch 54 rearwardly into engagement with the teeth 52 gives fifth speed through gears 51 and 89. Fifth speed is an overspeed, since the driven shaft rotates more rapidly than the driving shaft.

All of the various gears are preferably formed with spiral teeth, in order to eliminate gear noises as much as possible. The teeth on the driving gear 16 are arranged in such a manner that the end thrust produced by the spiral form thereof is in a forward direction when the engine is driving the car and is taken by the combined radial and thrust bearings 15. As the gear 16 is integral with the shaft 13, no end play can develop on this gear.

The thrust on the gear 90 is in a rearward direction and is transmitted to the shaft 71 through the sleeve 91, the gear 89, and the end face of the bearing 86. The thrust on gears 89, 83 and 82 is also in a rearward direction and is transmitted to the shaft through the end face of bearing 86 and the integral collar 79. The thrust on all the gears on the driven shaft 18 is in a forward direction and is transmitted to the shaft through the sleeves 53, 33 and 60, the nut 49, and the end face of bearing 25. In each instance it will be noted that the thrust of the gears on the driven shaft is taken by members which rotate with the shaft, and since an appreciable thrust on a gear is present only when that gear is coupled with the shaft, there is no excessive friction such as would be caused by relatively rotating end surfaces subjected to thrust. In addition, all the parts are rigidly positioned on the shaft, and any end play that might develop through wear can be readily taken up by adjustment of the appropriate nut on the driven shaft.

It will be evident that the thrust of the gears, after being transmitted to the respective shafts, is taken by the combined radial and thrust bearings 73 and 19 without appreciable frictional loss.

The shifting mechanism for the transmission is carried in the upper section 11 of the casing. As shown in Fig. 4, the casing section 11 is provided with a housing 99 suitably secured over an aperture in one side thereof. The housing is provided with journals 100 and 101 in which an operating shaft 102 is slidably and rotatably mounted. An arm 103 is secured to the shaft 102 and projects into the casing.

Within the casing section 11, three shifter rods 104, 105, and 106 are slidably mounted in bosses 107 and 108 formed integrally with the casing section. Yokes 109, 110 and 111 are fixedly carried by the shifter rods 104, 105 and 106, respectively. The yoke 109 is located adjacent the forward end of the casing section 11 and is arranged to fit in the groove of the clutch member 54. The yoke 110 is disposed substantially centrally of the casing section 11 between the webs 112 and 113 which cooperate with the webs 22 and 23 of the lower casing section 10, and is arranged to fit in the groove 37 of the clutch 36. The yoke 111 is disposed between the web 113 and the rear wall of the casing section 11 for cooperation with the clutch 61.

Opposite the housing 99, the shifter rods 104, 105 and 106 are provided respectively with arms 114, 115 and 116. Each of these arms is rigidly secured to its respective shifter rod and terminates in a U-shaped head 117, the three U-shaped heads being disposed adjacent each other with their openings in alinement, as indicated in Fig. 5. The arm 103 passes through a slot 118 in a guide member 119 and is provided at its inner end with a spherical head 120 for cooperation with the heads 117 of the arms 114, 115 and 116. The latter arms are arranged in such a manner that any selected one of them can be engaged by the head 120, by turning the operating shaft 102. After the head 120 has been engaged with one of the arms 114, 115, or 116, sliding movement of the operating shaft effects a corresponding sliding movement of the selected one of the shifter rods 104, 105, or 106. This movement causes a sliding movement of the respective clutch member through the yoke carried by the shifter rod.

The operating shaft 102 is moved by means of a hand lever 121 Fig. 7 which is rigidly secured to the forward end of the shaft and projects upwardly into the driver's compartment of the vehicle through a slotted guide plate 122. The latter is formed with three longitudinal slots connected by an intermediate transverse slot to provide six operative positions for the hand lever, these positions being designed R, 1, 2, 3, 4 and 5 to indicate respectively the positions for reverse and first to fifth forward speeds.

When the hand lever is moved towards the driver's left, the shaft 102 rotates and the arm 103 engages the arm 116. If the hand lever is then pushed away from the driver, the shaft 102 and shifter rod 106 move forwardly, carrying the clutch 61 into engagement with the teeth 59 and coupling the reverse gear 58 to the driven shaft. If the hand lever is then moved rearwardly, the clutch 61 is moved rearwardly into engagement with the teeth 65, giving first speed.

Similarly, forward movement of the hand lever in the intermediate slot moves the clutch 36 forwardly to give second speed, and rearward movement thereof moves the clutch 36 rearwardly for third speed. Movement of the hand lever in the slot on the right as seen by the driver causes corresponding movement of the clutch 54 to give fourth and fifth speeds.

It will be seen that the positions of the hand lever for the different speeds are arranged in accordance with the S. A. E. standard for gear shift positions; that is, first speed is obtained by moving the hand lever to the driver's left and pulling it rearwardly, and each successive higher speed is obtained by moving the hand lever alternately forward and backward.

The shifter rods are held against accidental movement by means of ball latches 123 (Fig. 6) mounted in holes drilled in the web 108 and urged towards the shafts by springs 124. Each shifter rod is formed with three notches 125 with which the associated ball 123 cooperates to hold the rod in its neutral and two operative positions. The latches are capable of being disengaged by pressure exerted upon the hand lever 121, but engage the rods with sufficient force to prevent unintentional shifting movement thereof.

Although the foregoing description is necessarily detailed in order that the invention may be completely set forth, it is to be understood that the specific terminology employed is not to be construed as restrictive or confining, and that rearrangements of parts and modifications in structure may be resorted to without departing from the spirit or scope of the invention as defined in the following claims.

I claim:

1. In a device of the class described, a shaft having an annular shoulder, a splined portion adjacent said shoulder to receive a gear, a threaded portion to receive a nut to retain said gear against said shoulder, a bearing portion beyond said threaded portion and having a diameter permitting passage thereover of said gear, another splined portion beyond said bearing and arranged to receive a second gear, means for preventing motion of said second gear in one direction and another threaded portion to receive a nut to retain said second gear on its splined portion and against said means.

2. In a device of the class described, a shaft having an abutment, a gear on said shaft retained against movement in one direction by said abutment, a sleeve on said shaft held against movement in said one direction, a nut screwed on said shaft and holding said sleeve and said gear against movement in the opposite direction, another gear on said shaft held against movement in said one direction by said sleeve, and another nut on said shaft holding said second gear against movement in said opposite direction.

3. In a transmission, a shaft having a pair of gears rotatably mounted thereon, a sleeve keyed to said shaft intermediate said gears, each of said gears having an annular portion adjacent said sleeve of a diameter equal to the diameter of said sleeve and carrying on its outer surface a series of teeth, a series of teeth on the outer surface of said sleeve equally spaced with the teeth on said annular portions and arranged to be brought into alignment with the teeth on said annular portions, and a clutch having internal teeth slidably engaging the teeth of said sleeve and arranged to be moved on said sleeve to engage the teeth of either of said annular portions.

4. In a transmission, a shaft having a pair of gears rotatably mounted thereon, a sleeve keyed to said shaft intermediate said gears and maintaining said gears in spaced relation, each of said gears having an annular portion adjacent said sleeve of a diameter equal to the diameter of said sleeve and carrying on its outer surface a series of teeth, a series of teeth on the outer surface of said sleeve equally spaced with the teeth on said annular portions and arranged to be brought into alignment with the teeth on said annular portions, and a clutch having internal teeth slidably engaging the teeth of said sleeve and arranged to be moved on said sleeve to engage the teeth of either of said annular portions.

5. In a transmission, a shaft having a pair of gears rotatably mounted thereon, a sleeve keyed to said shaft, means abutting said sleeve, a nut threaded on said shaft engaging said sleeve for retaining the same against said means, said sleeve, said means and said nut all being disposed between said pair of gears, and a clutch slidably mounted on said sleeve and arranged to slide in one direction over said means into engagement with one of said gears to couple the same to said shaft and to slide in the other direction over said nut into engagement with another of said gears to couple the same to said shaft.

6. In a transmission, a shaft having a cylindrical bearing portion intermediate its ends, a cylindrical gear supporting portion adjacent said bearing portion and of smaller diameter than the latter, a splined portion adjacent said gear supporting portion and having an external diameter smaller than the diameter of said gear supporting portion, a threaded portion adjacent said splined portion and having an external diameter smaller than the internal diameter of said splined portion, and another cylindrical gear supporting portion adjacent said threaded portion and having a diameter smaller than the internal diameter of said threaded portion.

7. In a transmission, a shaft formed with a cylindrical bearing portion, a splined portion adjacent said bearing portion of less diameter than said bearing portion, a threaded portion beyond said splined portion of less diameter than said splined portion, and a second bearing portion beyond said threaded portion of less diameter than said threaded portion, a gear rotatably mounted on said first named bearing portion, an internally splined sleeve mounted on the aforesaid splined portion of said shaft and designed to engage with the shoulder between said splined portion and said first named cylindrical portion and to restrain said gear against movement in one direction, means for restraining movement of said gear in the opposite direction, a nut screwed onto the aforesaid threaded portion of said shaft and maintaining said sleeve in engagement with the aforesaid shoulder, a second shaft mounted in alignment with said first named shaft and constructed with a gear formed with a recess which receives the aforesaid second named bearing portion of said first named shaft, said first named gear being constructed with an annular portion which extends into close proximity to the adjacent end of said sleeve, and said second named gear with a similar portion which extends over the aforesaid nut into close proximity with the opposite end of said sleeve, a series of teeth on each of said portions, a series of teeth on the outer surface of said sleeve equally spaced with the teeth on said annular portion and arranged to be brought into alignment with the teeth on said annular portion, and a clutch having internal teeth slidably engaging the teeth on said sleeve and arranged to be moved on said sleeve to engage the teeth of either of said annular portions.

HAROLD D. CHURCH.